United States Patent [19]

Dorste et al.

[11] Patent Number: 5,364,066
[45] Date of Patent: Nov. 15, 1994

[54] DUAL PORT VALVE WITH STEPPER MOTOR ACTUATOR

[75] Inventors: David C. Dorste, Frontenac; Dennis L. Hoehne, St. Louis; John W. Friend, Rock Hill; Donald L. Tillotson, St. Charles, all of Mo.

[73] Assignee: Sporlan Valve Company, St. Louis, Mo.

[21] Appl. No.: 92,324

[22] Filed: Jul. 15, 1993

[51] Int. Cl.⁵ .................... F16K 1/06; F16K 1/38
[52] U.S. Cl. .................... 251/122; 251/129.11; 251/903; 251/266; 251/210
[58] Field of Search ............ 251/129.11, 122, 903, 251/266, 210

[56] References Cited

U.S. PATENT DOCUMENTS

| | | | |
|---|---|---|---|
| 3,761,053 | 9/1973 | Bedo et al. | 251/903 X |
| 4,593,881 | 6/1986 | Yoshino | 251/129.11 X |
| 4,763,874 | 8/1988 | Ogawa | 251/129.11 X |
| 4,995,585 | 2/1991 | Gruber et al. | 251/129.11 X |
| 5,005,370 | 4/1991 | Tanaka et al. | |

*Primary Examiner*—Arnold Rosenthal
*Attorney, Agent, or Firm*—Cohn, Powell & Hind

[57] ABSTRACT

This refrigeration system expansion valve (10) includes a body (12) having an inlet (20) and an outlet (22) and a valve assembly (24) within the body (12). The valve assembly (24) includes a first port (28) communicating with the inlet (20) and a second, larger port (30) communicating with the outlet (22) and further includes a pin (32) having a first pin portion (34) received by the first port (28) and a second pin portion (36) received by the second port (30). A stepper motor (100) attached to the valve body (12) cooperates with an actuator assembly (60) attached to the pin (32) to induce longitudinal movement into the pin and thereby control refrigerant flow through the valve.

12 Claims, 1 Drawing Sheet

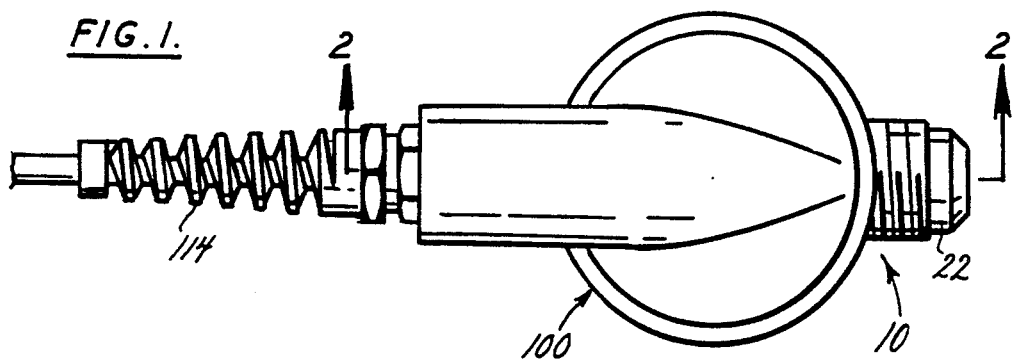
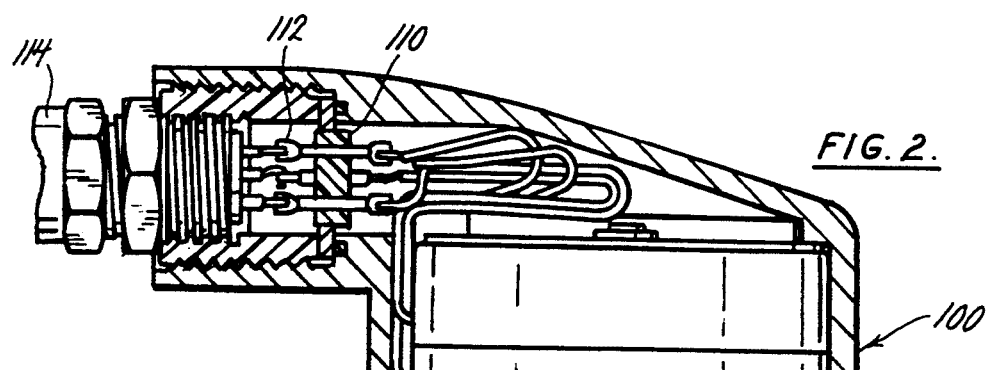
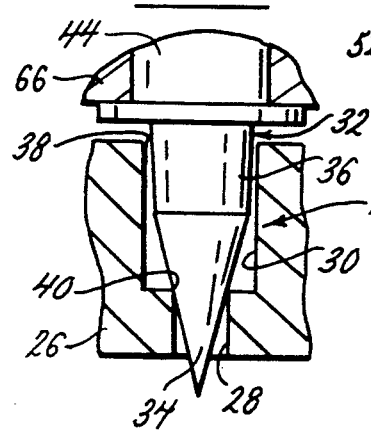
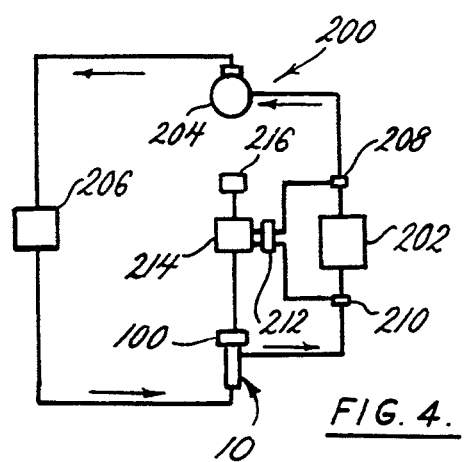

DUAL PORT VALVE WITH STEPPER MOTOR ACTUATOR

BACKGROUND OF THE INVENTION

This invention relates generally to expansion valves for refrigeration systems and particularly to an expansion valve having a dual port and pin valve assembly to control refrigerant flow through the valve and preferably uses a stepper motor actuator to operate the valve assembly.

In general, refrigeration systems of the type under consideration consist of a compressor, an evaporator, a condenser and an expansion device, typically a thermostatic expansion valve. The primary purpose of the expansion valve is to control liquid refrigerant flow to the evaporator so that a predetermined amount of superheat vapor is maintained in the suction line.

Conventional thermostatic expansion valves usually incorporate a motor element such as a diaphragm. The diaphragm is responsive to the heat in the system, for example at the evaporator outlet, and controls a valve port within the valve which is located between the valve inlet and the valve outlet. Conventionally, the diaphragm is connected to the valve pin by pushrods and, while this actuator system works well in many applications, there is a need for more precise flow control in other applications.

Theoretically, diaphragm actuated expansion valves have infinite positional control. However, factors such as diaphragm stresses, pushrod friction, and spring side loading create valve hysteresis. It is hysteresis that makes infinite positional control unachievable in practice. Also, diaphragm actuated expansion valves have difficulty providing the precision movement required when it is desired to lower superheat settings and insure stable control.

In addition, the stroke limitations of a diaphragm, and the fact that these valves are sized for maximum, or worst case, load conditions, drastically limit their ability to provide suitable performance under partial load conditions. Most refrigeration and air conditioning systems operate at less than maximum load most of the time. Therefore, an expansion device capable of providing lower stable superheat control at reduced loads would provide improve operating efficiency.

To meet this need, the control of the expansion valve by electronic rather than by the more direct thermostatic means has been used. There are advantages in using a stepper motor to control the valve flow as discussed in commonly owned U.S. Pat. No. 4,911,404, which is incorporated herein by reference. For example, a stepper motor actuated valve provides discrete segments of valve stroke for each incremental angular movement, or step. A stepper motor has the advantage of being readily incorporated into a digital control system because the reliability and low hysterisis provide precise, repeatable valve positions. In this way, the creation of a hunting or cyclic pattern, which has historically been associated with conventional expansion devices, is avoided.

A stepper motor actuated valve has unlimited stroke potential, but fixed positional control. The valve can be designed to provide stroke and positional control that will allow for flow characterization of the port. The right combination of stroke, positional control, and flow characterization can provide flow resolution better than 0.5° F. superheat/step.

Probably the greatest advantage of a stepper motor actuated expansion valve is the capability of precise control of refrigerant flow through the evaporator. However, the capability of the valve to provide a high degree of flow control leads to other advantages, such as lower "stable" system superheat; lower return gas temperatures, and higher back pressures. These advantages can contribute to less dehydration of the refrigerated air space; more efficient use of the evaporator surface, and improved operating energy efficiency. Stepper motor actuated valves have other advantages such as being independent of system pressures; being direct acting thereby providing bidirectional flow, and having tight seating liquid line shut-off capabilities. Also, the fact that the stepper motor actuated valve is an electromechanical device allows for all of the advantages of a microprocessor control.

However, the use of a stepper motor is not a solution to all problems and attempts have been made to improve the valve port characteristics. It is to the improvement of valve port characteristics, particularly in conjunction with a stepper motor actuator, that the present invention is directed.

SUMMARY OF THE INVENTION

This expansion valve for a refrigeration system provides an improved valve control assembly utilizing a dual port, dual angle pin arrangement which improves flow of refrigerant through the valve and is readily adapted for use with a stepper motor. The dual port arrangement extends the usable stroke of the pin for a given port diameter and the use of a stepper motor to actuate the valve permits precise movement of the dual angled pin within the valve body.

This invention provides an expansion valve comprising a valve body including an inlet means and an outlet means, valve means disposed within the body between the inlet means and the outlet means and including port means and pin means cooperating with the port means to control refrigerant flow through the valve, the port means having a first port communicating with the inlet means and a second port communicating with the outlet means and the pin means having a first portion received by the first port and a second portion received by the second port, and means actuating the pin means.

It is an aspect of this invention to provide that the first port is smaller than the second port.

It is another aspect of this invention to provide that the first pin portion has an included angle seating surface greater than the included angle seating surface of the second pin portion.

It is yet another aspect of this invention to provide that the included angle seating surface of the first pin portion is about 30° and the included angle seating surface of the second pin portion is about 6°.

It is still another aspect of this invention to provide that the actuating means includes a stepper motor.

It is an aspect of this invention to provide that the stepper motor includes a shaft and the means actuating the pin means includes a drive screw and cooperating drive nut operatively connecting the pin means to the stepper motor.

It is another aspect of this invention to provide that the means actuating the pin means includes reducer means between the stepper motor shaft and the drive screw.

It is yet another aspect of this invention to provide that an adaptor means is connected to the stepper motor housing the reducer means, and the adaptor means is threadedly connected to the valve body.

It is still another aspect of this invention to provide that the actuator means includes sleeve means extending between the adaptor means and the body and receiving the nut in slidable, non-rotatable relation.

It is an aspect of this invention to provide that the first and second pin portions are arranged so that when the first port is closed by the first pin portion, the second port is open.

This invention provides an expansion valve which is relatively easy and inexpensive to manufacture and is very effective in operation.

BRIEF DESCRIPTION OF THE DRAWING

FIG. 1 is plan view of the valve and stepper motor;

FIG. 2 is an enlarged longitudinal sectional view taken on line 2—2 of FIG. 1;

FIG. 3 is an enlarged fragmentary view of the valve assembly, and,

FIG. 4 is a schematic of a refrigeration system incorporating the valve.

DESCRIPTION OF THE PREFERRED EMBODIMENT

Referring now by reference numerals to the drawing and first to FIG. 4. It will be understood that, in the embodiment shown, the expansion valve assembly 10 is used in conjunction with a refrigeration system 200 which includes an evaporator 202, a compressor 204 and a condenser 206. In the embodiment shown, the expansion valve 10 is actuated by a stepper motor 100 which is responsive to temperature sensors 208 and 210 and the sensors input to a microprocesser 212 which is connected to an electronic switch device 214 disposed between a power supply 216 and the stepper motor 100.

As best shown in FIG. 2, the expansion valve assembly 10 includes a valve body 12 having a flanged upper portion 14, and a lower portion 16. The valve body 12 includes an inlet 20, provided with a strainer 21, and an outlet 22 separated from the inlet by a valve assembly 24. The valve assembly 24, as best shown in FIG. 3, includes a partition 26 providing dual port portions 28 and 30 and a pin 32 providing dual pin portions 34 and 36, respectively, cooperating with their associated ports 28 and 30 to control the amount of refrigerant passing through the valve assembly. As shown, the included angle of the seating surface of the first pin portion 34 is substantially greater than that of the second pin portion 36. The valve port portion 28 communicates with the inlet 20 and the valve port portion 30, which is larger than portion 28, communicates with the outlet 22 and, in the embodiment shown, there exists an annular opening between the pin portion 36 and the margin 38 of port portion 30 when the port 28 is closed by engagement between the pin portion 34 and the port margin 40.

The stepper motor 100 is connected to the valve body 12 by an adaptor 50, and, as best shown in FIG. 2, the pin 32 is actuated by the stepper motor 100 through the medium of an actuator assembly generally indicated by numeral 60, as will be later described. More specifically, the adaptor 50 includes an upper portion 52, an intermediate portion 54 and a threaded lower portion 56. The upper portion 52 is connected to the stepper motor housing 102 in sealed relation, as by coining or epoxying at 104. The adaptor lower portion 56 is held in sealed abutting relation to the valve body flanged upper end 14 by a locknut 58.

The actuator assembly 60 includes a sleeve 62 extending between the body 12 and the adaptor 50, which is recessed to receive the upper portion of the sleeve and to house a bearing 64. The actuator assembly 60 also includes a drive nut 66 which is received in sliding, non-rotatable relation within the sleeve 62 by virtue of a non-circular, for example oblong, relationship between the exterior of the nut 66 and the interior of the sleeve 62. The nut 66 receives the flanged shank 44 of the pin 32 in fixed relation and is moved longitudinally by a screw 68, which is bored to receive fixedly attached drive shaft 70 mounted in the bearing 64. The shaft 70 is rotated by a reducer gear train 80 housed within the adaptor 50. In the embodiment shown, the gear train 80 includes a drive gear 82 mounted to the stepper motor shaft 106, an offset idler reduction gear 84,86 mounted between the stepper motor end plate 108 and the adaptor intermediate portion 54 a gear 88 fixedly attached to the end of the shaft 70. In the embodiment shown, the gear train 80 is selected to provide a reduction of about 12:1 between the stepper motor shaft 106 and the shaft 70 connected to the screw 68. Also, the stepper motor 100 is provided with a glass feed-thru partition 110 to hermetically isolate the conductors 112 of the cable 114 from the refrigerant flowing through the valve 10.

It is thought that the structural relationship of parts and the functional advantages of this expansion valve have become fully apparent from the foregoing description but for completeness of disclosure the operation of the valve will be briefly described.

The stepper motor 100, adaptor 50 gear assembly 80 and all of the parts of the actuator assembly 60 are hermetic to the refrigeration system 200. In addition, motor leads 112 are hermetically connected to the power cable 114 to insure a leak tight valve assembly. The motor 100, adaptor 50, and gear assembly 80 are preassembled and connected to the valve 10 by the locknut 58 which facilitates 360° positioning of the motor cable 114 and facilitates servicing.

The stepper motor 100 receives step pulses from the microprocessor 212, which is responsive to temperature sensors 208 and 210. In the embodiment shown, each pulse steps the motor 7.5° with a reduction of about 12:1 and a corresponding increase in torgue. The use of a 48 pitch modified stainless steel Acme screw 68 and a molded Nylatron nut 66 are selected to provide longitudinal movement of 0.0000816 inches per step pulse. As will be readily understood, such a small longitudinal movement of the nut 66 in response to rotation of the stepper motor shaft 106 provides a precise adjustment of the pin 32 relative to the dual ports.

In the embodiment shown, the valve pin first portion 34 is provided with an included pin angle of the order of 30°. The valve pin second portion 36 is provided with a much smaller included pin angle of the order of 6°. As clearly shown in FIG. 3, when the first port 40 is closed by engagement of the margin with the first pin portion 34 the second pin portion is still spaced from the margin of the second port 36. Accordingly, in the embodiment shown, the second port is always open.

The dual port arrangement extends the usable stroke for a given port diameter. In operation, the liquid refrigerant entering the valve assembly 24 expands across the first, smaller port 28 reducing the pressure drop across the second larger port 30. The second port 30 receives the smaller taper pin portion 36 to provide optimum resolution. This dual port design allows extension of the flow control of a one ton port, for instance, from 0.018 inches of stroke to 0.125 inches of stroke, which provides superior flow resolution per step, resulting in improved superheat and discharge air control.

Although the improved expansion valve has been described by making particular reference to a preferred expansion valve assembly, the details of description are not to be understood as restrictive, numerous variants being possible within the principles disclosed and within the fair scope of the claims hereunto appended.

We claim as our invention:

1. An expansion valve for a refrigeration system, the valve comprising:
   (a) a valve body including an inlet means and an outlet means,
   (b) valve means disposed within the body between the inlet means and the outlet means and including port means and pin means cooperating with the port means to control refrigerant flow through the valve,
   (c) the port means having a first port communicating with the inlet means and a second port communicating with the outlet means and the pin means having a first portion received by the first port and a second portion received by the second port, said ports being of different size and said pin portions being of a different included angle, the first port being smaller than the second port and the first pin portion having an included angle greater than the included angle of the second pin portion, and
   (d) means actuating the pin means.

2. An expansion valve as defined in claim 1, in which:
   (e) the included angle of the first pin portion is about 30° and the included angle of the second pin portion is about 6°.

3. An expansion valve as defined in claim 1, in which:
   (e) the actuating means includes a stepper motor.

4. An expansion valve as defined in claim 3, in which:
   (f) the stepper motor includes a shaft and the means actuating the pin means includes a drive screw and cooperating drive nut operatively connecting the pin means to the stepper motor.

5. An expansion valve as defined in claim 4, in which:
   (g) the means actuating the pin means includes reducer means between the stepper motor shaft and the drive screw.

6. An expansion valve for a refrigeration system, the valve comprising:
   (a) a valve body including an inlet means and an outlet means,
   (b) valve means disposed within the body between the inlet means and the outlet means and including port means and pin means cooperating with the port means to control refrigerant flow through the valve,
   (c) the port means having a first port communicating with the inlet means and a second port communicating with the outlet means and the pin means having a first portion received by the first port and a second portion received by the second port, and
   (d) means actuating the pin means including a stepper motor,
   (e) the stepper motor including a shaft and the means actuating the pin means including a drive screw and cooperating drive nut operatively connecting the pin means to the stepper motor,
   (f) the means actuating the pin means including reducer means between the stepper motor shaft and the drive screw, and
   (g) an adaptor means being connected to the stepper motor housing the reducer means,
   (h) the adaptor means being threadedly connected to the valve body.

7. An expansion valve as defined in claim 6, in which:
   (i) the actuator means includes sleeve means extending between the adaptor means and the body and receiving the nut in slidable, non-rotatable relation.

8. An expansion valve for a refrigeration system, the valve comprising:
   (a) a valve including an inlet means and an outlet means,
   (b) valve means disposed within the body between the inlet means and the outlet means, including port means and pin means cooperating with the port means to control refrigerant flow through the valve,
   (c) the port means having a first port communicating with the inlet means and a second port communicating with the outlet means, the first port being smaller than the second port and the pin means having a first portion received by the first port and a second portion received by the second port, the first pin portion having an included angle greater than the included angle of the second pin portion, and
   (d) means actuating the pin means including a stepper motor having a shaft and being operatively connected to the valve body and means operatively connecting the stepper motor to the pin means,
   (e) the connecting means including a drive screw and a reducer means between the stepper motor shaft and the drive screw and a cooperating drive nut fixedly attached to the pin means and receiving the drive nut for longitudinal non-rotatable movement of said drive nut and pin means in the valve body.

9. An expansion valve as defined in claim 8, in which:
   (f) the first and second pin portions are arranged so that when the first port is closed by the first pin portion, the second port is open.

10. An expansion valve as defined in claim 3, in which:
    (f) the stepper motor includes a gear reducer means having a single idler gear between the stepper motor and the pin means.

11. An expansion valve as defined in claim 10, in which:
    (g) the gear reducer provides a reduction of about 1:12.

12. An expansion valve as defined in claim 1, in which:
    (e) the first and second pin portions are arranged so that when the first port is closed by the first pin portion, the second port is open.

* * * * *